Figure 1:
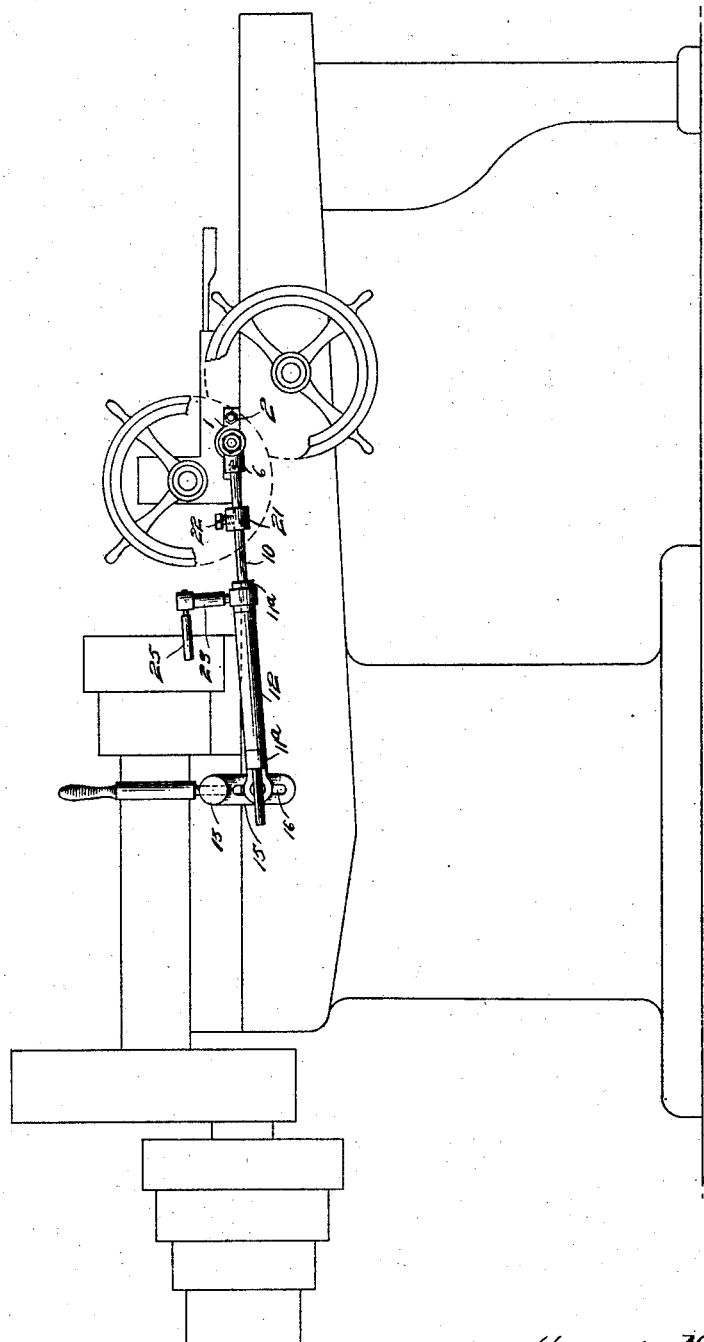

No. 883,561. PATENTED MAR. 31, 1908.
H. NEVILLE.
TAPER CUTTING AND THREADING ATTACHMENT FOR BOLT CUTTING MACHINES.
APPLICATION FILED SEPT. 12, 1907.
2 SHEETS—SHEET 1.

Witnesses
Inventor
Harry Neville
by Attorneys

No. 883,561. PATENTED MAR. 31, 1908.
H. NEVILLE.
TAPER CUTTING AND THREADING ATTACHMENT FOR BOLT CUTTING MACHINES.
APPLICATION FILED SEPT. 12, 1907.
2 SHEETS—SHEET 2.
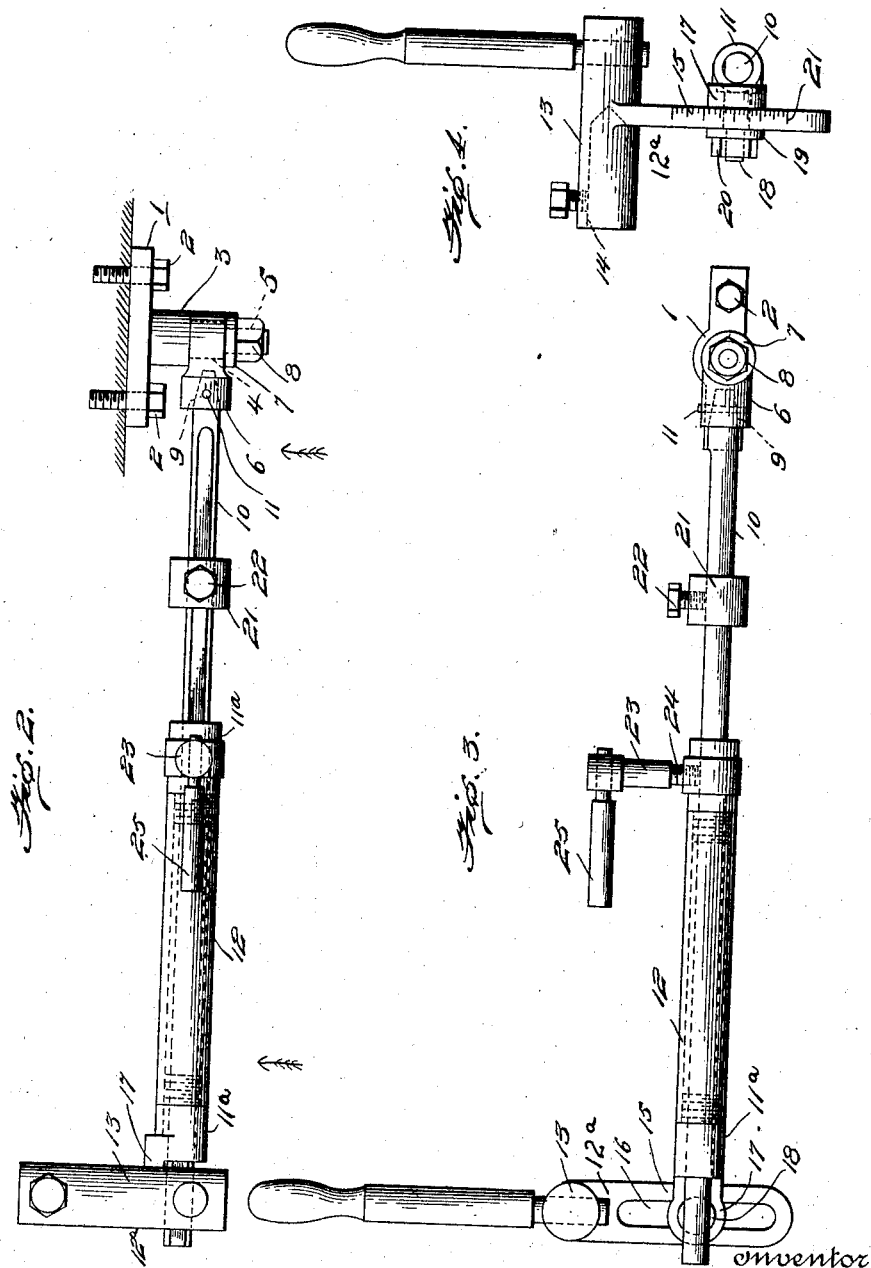

UNITED STATES PATENT OFFICE.

HARRY NEVILLE, OF LOS ANGELES, CALIFORNIA.

TAPER CUTTING AND THREADING ATTACHMENT FOR BOLT-CUTTING MACHINES.

No. 883,561.　　　　Specification of Letters Patent.　　Patented March 31, 1908.

Application filed September 12, 1907. Serial No. 392,549.

*To all whom it may concern:*

Be it known that I, HARRY NEVILLE, a citizen of the United States, residing at Los Angeles, in the county of Los Angeles and State of California, have invented certain new and useful Improvements in Taper Cutting and Threading Attachments for Bolt-Cutting Machines; and I do declare the following to be a full, clear, and exact description of the invention, such as will enable others skilled in the art to which it appertains to make and use the same.

This invention has relation to new and useful improvements in taper cutting and threading attachments for bolt cutting machines, and has for its object the production of a simple and inexpensive device of this character, adapted to be readily and easily applied in operative position to a bolt cutting machine, through the use of which taper threads may be cut on the bolts in an expeditious manner, and with a minimum of labor on the part of the operator.

With the foregoing and other objects in view, that will readily appear as the nature of the invention is better understood, the invention consists in the novel features, of construction, combination and arrangement of parts, illustrated in the drawings, and particularly pointed out in the appended claims.

In the accompanying drawings, Figure 1 is a view of the taper cutting and threading attachment constructed in accordance with the invention applied in operative position to a bolt cutting machine, only so much of the machine being shown as is necessary to illustrate the invention, Fig. 2, is a plan view of the invention detached from position with parts broken away to more advantageously illustrate the invention, Fig. 3 is a side elevation of Fig. 2 looking in the direction indicated by the arrows and, Fig. 4 is a front end view of the invention detached from position.

Referring to the accompanying drawings, which are for illustrative purposes only, and therefore not drawn to any particular scale, 1 indicates a frame adapted to be attached to the carriage of the bolt cutting machine by screws 2 or other equivalent means, and 3 a rocker shaft projecting laterally and outwardly from the frame. This shaft comprises a central or intermediate portion 4 having a reduced threaded outer end portion or stem 5. A rocker 6 is pivotally connected at its inner or rear end to the central part of the rocker shaft and is held in removable position thereto by a washer, and nut 7 and 8, respectively, arranged on the stem of the rocker shaft.

The front or free end of the rocker is provided with a longitudinally disposed socket 9 adapted to receive the correspondingly shaped end of a connecting rod 10, said end being removably connected with the rocker by a pin 11 passing transversely through the socket end thereof. The opposite end of the connecting rod works through two longitudinally spaced tubular guide members 11ª, having each an exteriorly threaded stem to receive the interiorly threaded ends of a connecting sleeve or other tubular member 12, for establishing a substantial connection between the guide members and coacting therewith in providing a guide and support for the free end of the connecting rod. A frame 12ª, comprising a laterally disposed body portion 13, having a longitudinal socket 14 in one end to receive the die controlling shaft of the bolt cutting machine, and a central, outwardly extending arm 15, extending at right-angles from said body portion, is provided. To provide an adjustable connection for the outer guide member, that the invention may be adjusted for different tapers, I provide the arm of said frame with a longitudinal slot 16 and outer end of the front guide member with a forwardly extending flat arm or extension 17 adapted to bear against the outer face of the arm of said frame. A bolt 18 having its head countersunk in the outer face of said arm or extension 17, extends through said slot 16 and is provided at its inner end with a reduced threaded portion or stem 18 to receive a washer and nut 19 and 20, respectively.

By the above defined construction, it will be readily perceived that the front guide member may be easily and readily adjusted, with relation to the longitudinal axis of the arm and the device adjusted for different tapers. The outer edge of said arm 15 is provided with a scale or graduation 21 to enable this adjustment to be accurately made.

A collar 21 is slidably mounted on the rear end of the connecting rod and is provided with a set screw 22, whereby it may be held in an adjusted position on the rod.

Clamping means comprising an upright post or member 23 having a reduced threaded portion or stem 24 at its lower end adapted to work through the rearmost guide member 11ª and engage the connecting rod, and an operating handle arranged at the upper end of said post or member is provided so that the connecting rod may be held against movement relatively to the guide members and a secure connection established between the arm of the frame 12ª and the carriages of the bolt cutting machine, the purpose of which will be shown.

In practice, a piece of work placed in proper position in the carriage of the bolt cutting machine, and sent forwardly by the operator. The collar 21 is so arranged on the connecting rod as to abut or engage the adjacent guide member, just as the work is received by dies of the bolt cutting machine. The collar is then made fast with the connecting rod by the set screw 22. The operating handle 25, of the clamping means is then turned to effect a secure engagement between the reduced threaded portion or stem 24 of the upright post or member 23, and connecting rod. This done, relative movement of the connecting rod with the guiding means is prevented and a solid or substantial connection effected between the carriage of the bolt cutting machine and the die controlling shaft of the machine. The carriage of the machine is then moved inwardly during which operation the dies are cutting the thread, and the die controlling shaft turning and opening the dies. When sufficient thread has been cut on the piece of work, the operator turns the handle 24 to release the threaded stem 24 of the upright post with the connecting rod, when the dies fly open and the carriage travels to its initial position, and carries with it the connecting rod.

Having thus described my invention, what I claim, is:

1. In a bolt cutting machine, a taper threading attachment comprising a connecting rod arranged for pivotal connection with the carriage of said machine, guiding means for the free end of the connecting rod, a frame comprising a horizontal member adapted to be fixed to the die controlling shaft of the machine, and an arm extending at right angles to said member, means for maintaining the connecting rod in fixed position, relative to the guiding means, means for connecting the arm of the frame with the adjacent end of the guiding means, and means adjustably mounted on the end of the connecting rod for engaging the end of the guiding means.

2. In a bolt cutting machine, a taper threading attachment comprising a connecting rod arranged for pivotal connection with the carriage of the machine, longitudinally spaced tubular guide members, a tubular member arranged between said guide members, said tubular and guide members receiving the free end of the connecting rod, a frame comprising a horizontal member having a socket in one end to receive the die controlling shaft of the machine, and an arm extending at right-angles therefrom, means for connecting the front guide member with the arm of the frame, means for maintaining the connecting rod against relative movement with the guide members and means mounted on the end of the connecting rod for engaging the adjacent guide member.

3. In a bolt cutting machine, a taper cutting and threading attachment comprising a frame having a laterally disposed body with a socket in one end to receive the die controlling shaft of the machine, and a longitudinally slotted arm extending at right-angles from said body, two longitudinally spaced tubular guide members, a connecting sleeve arranged between the members, means for connecting the front tubular member with the arm of the frame, a longitudinally disposed connecting rod working through the guide members and connecting sleeve, means for pivotally connecting the rear end of said rod with the carriage of the bolt cutting machine, and means mounted on the pivoted end of the connecting rod for engaging the adjacent guide member with means for holding the connecting rod against relative longitudinal movement.

In testimony whereof I have hereunto set my hand in presence of two subscribing witnesses.

HARRY NEVILLE.

Witnesses:
FRANK GARRETT,
WALTER F. HAAS.